J. S. BENEDICT.
Fence Gate.
No. 58,369. Patented Oct. 2, 1866.
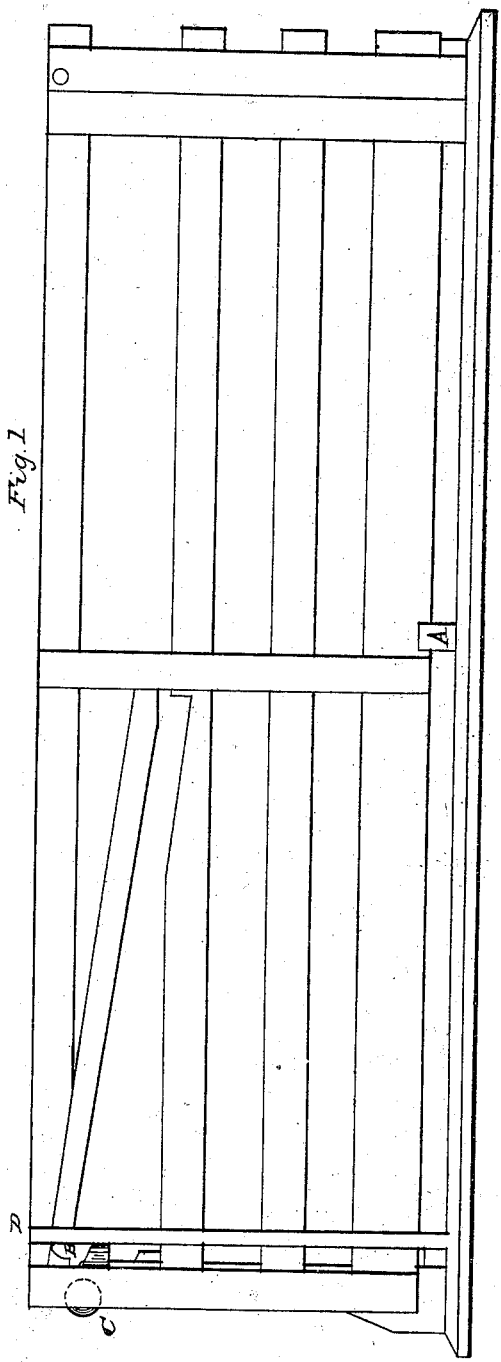

UNITED STATES PATENT OFFICE.

J. S. BENEDICT, OF BEDFORD, OHIO.

IMPROVEMENT IN FENCE-GATES.

Specification forming part of Letters Patent No. 58,369, dated October 2, 1866.

*To all whom it may concern:*

Be it known that I, J. S. BENEDICT, of Bedford, in the county of Cuyahoga and State of Ohio, have invented certain new and useful Improvements in Fence-Gates, being an improvement on a patent granted me March 27, 1866; and I do hereby declare that the following is a full and complete description thereof, reference being had to the accompanying drawing, making a part of this specification, in which—

Figure 1 is a side view of the gate.

Like letters of reference refer to like parts in the views.

A represents a central guide or rest for the gate. It consists of a block grooved on the top and placed in the ground far enough to hold it firmly.

The gate rests in the groove, the sides of which keep it in place, and render it much easier to slide or move back and forth, avoiding the necessity of lifting it from the ground in opening or closing. It also avoids the friction and wear which necessarily must ensue by coming in contact with the ground. It is placed near the center of the gate, and supports it till it is slid back near a certain point, where it will nearly balance itself on its hinge B, and therefore move with ease. It also serves to protect the gate by keeping it firm at the bottom, and preventing the smaller animals pushing it out of place or breaking it down.

It will be noted that the weight of the gate is upon rest A and roller C as it is opened and closed, and as the end D of the gate rises in opening the opposite end is tipped down, which causes the gate to work hard without the rest.

By means of the guide-rest the gate is easily guided so as to latch onto the post E. The rest also forms a brace in protecting the gate from lateral strain.

I claim and desire to secure by Letters Patent—

The rest A, in combination with the gate, roller C, and hinge B, when arranged and operating conjointly, as and for the purpose specified.

JULIUS S. BENEDICT.

Witnesses:
W. H. BURRIDGE,
E. E. WAITE.